United States Patent [19]

Fujihara et al.

[11] Patent Number: 5,065,011
[45] Date of Patent: Nov. 12, 1991

[54] PHOTODETECTOR MODULE FOR COUPLING WITH OPTICAL FIBER

[75] Inventors: Makoto Fujihara, Yokohama; Nobuyoshi Horigome, Chofu; Kaoru Moriya, Kawasaki; Akira Okamoto, Higashikurume; Kenji Tagawa, Tachikawa; Gan Oda, Hiratsuka, all of Japan

[73] Assignee: Fujitsu Limited, Kawasaki, Japan

[21] Appl. No.: 553,609

[22] Filed: Jul. 18, 1990

[30] Foreign Application Priority Data

Jul. 20, 1989 [JP] Japan ............................. 1-185904
Jul. 25, 1989 [JP] Japan ............................. 1-190605
Sep. 19, 1989 [JP] Japan ............................. 1-240868

[51] Int. Cl.$^5$ .................................................. H01J 5/16
[52] U.S. Cl. ................................. 250/227.24; 385/49
[58] Field of Search ............ 250/227.24, 239, 551; 350/96.15, 96.17, 96.18

[56] References Cited

U.S. PATENT DOCUMENTS

4,479,696 10/1984 Lubin et al. ................. 250/227.24
4,658,130 4/1987 Durbin ........................ 250/227.24

Primary Examiner—David C. Nelms
Assistant Examiner—Khaled Shami
Attorney, Agent, or Firm—Staas & Halsey

[57] ABSTRACT

A photodetector module comprising an optical fiber and a photodetector which are coupled by direct optical coupling is disclosed. A photodetector chip is fixedly attached to the circular top surface, having the shape of a circle circumscribed around the photodetector chip, of a carrier having the shape of a frustum of a circular cone, or the photodetector chip is fixedly attached to the circular bottom surface, having the shape of a circle circumscribed around the photodetector chip, of a circular recess formed in the bottom of a taper recess formed in the carrier and having the shape of a frustum of a circular cone. Such a combination of the photodetector chip and the carrier enables the omission of the positional adjustments of the photodetector chip on the carrier with respect to the X-axis and the Y-axis. A ferrule having a flange and a ferrule support member having a taper surface fitting the taper surface of the carrier are employed to omit the positional adjustment of the photodetector chip with respect to the Z-axis. Thus, the photodetector module can be assembled without requiring the positional adjustments of the photodetector chip relative to the optical fiber.

9 Claims, 8 Drawing Sheets

PHOTODETECTOR MODULE FOR COUPLING WITH OPTICAL FIBER

BACKGROUND OF THE INVENTION

The present invention relates to a photodetector module for the direct optical coupling of an optical fiber and a photodetector.

The output light beam from an optical fiber is focused with a lens on the light receiving surface of a photodetector to couple the optical fiber and the photodetector. When a tapered optical fiber with a spherical tip is used for transmitting a light beam, the output light beam from the tapered fiber is directed directly toward the light receiving surface of a photodetector with the spherical tip of the tapered optical fiber to couple the optical fiber and the photodetector without using any lens. Since the former optical coupling method focuses the output light beam from the optical fiber with the lens, the diameter of the light receiving surface of the photodetector may be comparatively small. Therefore, wideband low-noise characteristics can readily be secured. However, such an optical coupling method needs a comparatively large photodetector module of a complicated construction.

Recently, a direct-coupling photodetector module employing a tapered optical fiber with a spherical tip has been proposed. This direct-coupling photodetector module is not provided with any lens and focuses the output light beam from the tapered optical fiber on the light receiving surface of the photodetector with the spherical tip of the tapered optical fiber. Since the spherical tip of the tapered optical fiber functions for focusing the output light beam on the light receiving surface of the photodetector, this photodetector module, as well as the photodetector module employing a lens for focusing, is capable of securing wideband low-noise characteristics.

Figure 1:
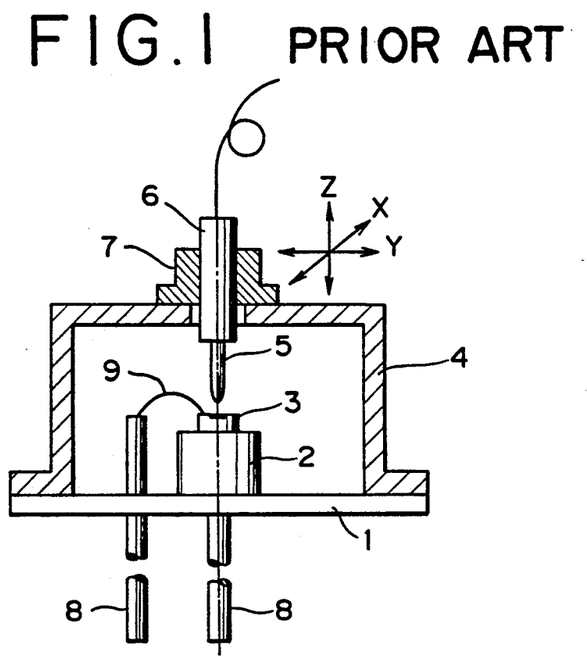
FIG. 1 is a longitudinal sectional view of a conventional photodetector module.

A typical conventional direct-coupling photodetector module will be described with reference to FIG. 1. A ceramic submount 2 is mounted on a Kovar stem 1, and a photodetector chip 3, such as a photodiode (PD) chip, is mounted on the submount 2. A cap 4 formed of Kovar or a stainless steel is joined to the stem 1 by projection welding.

After assembling the photodetector chip 3, the cap 4 and other components on the step 1, a tapered optical fiber 5 with a spherical tip is disposed opposite to the photodetector chip 3, the position of a ferrule 6 relative to a sleeve 7 is adjusted as a light beam is projected through the tapered optical fiber 5 so that the optical axis of the tapered optical fiber 5 is aligned with the Z-axis, and the cap 4 and the sleeve 7 are moved relative to the cap 4 for adjustment with respect to the X-axis and the Y-axis to thereby attain an optimum optical coupling. Then, the sleeve 7 and the ferrule 6 are soldered respectively to the cap 4 and the sleeve 7 to seal the assembly hermetically. The photodetector module shown in FIG. 1 is provided with terminals 8 and a bonding wire 9. This conventional photodetector module requires difficult work for assembling because the position of the optical fiber 5 relative to the photodetector chip must be adjusted with respect the three axes, i.e., the X-axis, Y-axis and Z-axis.

SUMMARY OF THE INVENTION

Accordingly, it is an object of the present invention to provide a photodetector module which can be assembled without requiring positional adjustments between the photodetector and the optical fiber.

Another object of the present invention is to provide a die bonding method capable of easily and accurately positioning a photodetector chip in assembling a photodetector module.

In accordance with a first aspect of the present invention, there is provided a photodetector module comprises: a photodetector chip having a cuboidal shape; a ferrule having a flange; a carrier having the shape of a frustum of a circular cone having a circular top surface supporting the photodetector chip and having a shape exactly circumscribed around the photodetector chip; a ferrule support member provided with a taper recess formed in the shape of a frustum of a circular cone having a conical surface fitting that of the carrier, and a ferrule receiving hole fixedly receiving the ferrule with the flange of the same seated on its end surface, formed in the central portion thereof so as to open into the taper recess, and put on the carrier with the conical surface of the taper recess in close contact with that of the carrier; and an optical fiber fixedly inserted in the ferrule with the extremity thereof positioned at a given distance from the photodetector chip.

In accordance with a second aspect of the present invention, there is provided a photodetector module comprises: a photodetector chip having a cuboidal shape; a ferrule having a flange; a carrier provided with a recess having the shape of a frustum of a circular cone having a bottom surface provided with a circular recess having a shape exactly circumscribed around the photodetector chip and fixedly accommodating the photodetector chip; a ferrule support member provided with a ferrule receiving hole in its central portion to receive the ferrule fixedly therein with the flange of the same seated on its end surface, having a conical surface fitting the conical surface of the recess of the carrier, and fixedly put on the carrier with the conical surface thereof in close contact with that of the carrier; and an optical fiber fixedly inserted in the ferrule with its extremity positioned at a give distance from the photodetector chip.

In accordance with a third aspect of the present invention, there is provided a photodetector module comprises: a photodetector chip having a cuboidal shape and a rectangular or square light receiving surface provided in its central portion with a light receiving area; a ferrule formed in the shape of a frustum of a circular cone having a circular top surface having a shape exactly circumscribed around the photodetector chip and fixedly mounted with the photodetector chip, and provided with a central bore; and an optical fiber fixedly inserted in the central bore of the ferrule with its end surface positioned on a plane including the circular top surface of the ferrule.

In accordance with a fourth aspect of the present invention, there is provided a method of die-bonding a photodetector chip to a carrier at a given position on the same comprises the steps of: forming a circular recess having a shape exactly circumscribed around the photodetector chip in the carrier; melting a solder pellet by placing the same in the circular recess of the carrier after heating the carrier; placing the photodetector chip in the circular recess; and fixing the photodetector chip in place by stopping heating the carrier to solidify the solder.

The present invention enables the automatic positional adjustments of the photodetector chip and the optical fiber in assembling the photodetector module, so that work for assembling the photodetector module is facilitated.

The above and other objects, features and advantages of the present invention and the manner of realizing them will become more apparent, and the invention itself will best be understood from a study of the following description and appended claims with reference had to the attached drawings showing some preferred embodiments of the invention.

DESCRIPTION OF THE PREFERRED EMBODIMENTS

Figure 2:
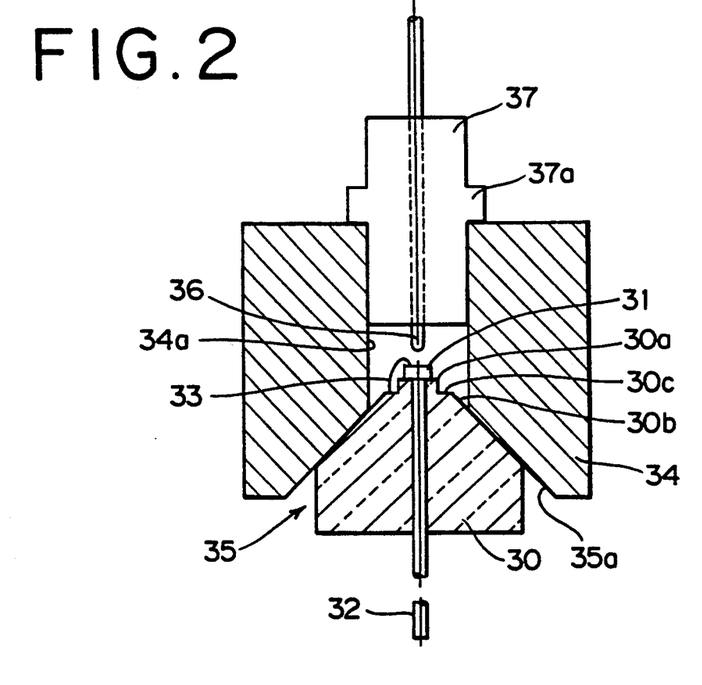
FIG. 2 is a longitudinal sectional view of a photodetector module in a first embodiment according to the present invention.
Figure 3:
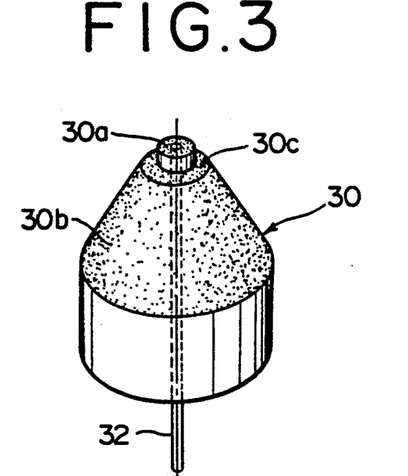
FIG. 3 is a perspective view of a carrier having the shape of a frustum of a circular cone, employed in the first embodiment.
Figure 4:
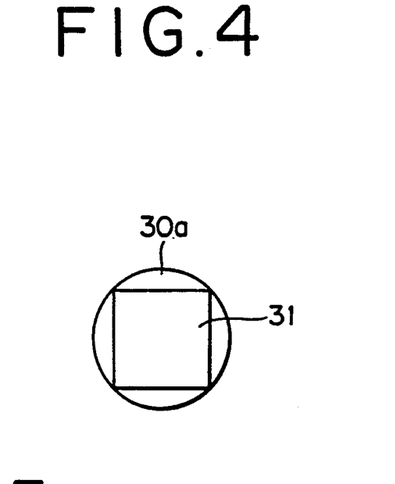
FIG. 4 is a view of assistance in explaining the disposition of a photodetector chip on the top surface of a carrier.

First Embodiment (FIGS. 2, 3 and 4)

Referring to FIGS. 2, 3 and 4, a carrier 30 is formed of a ceramic, such as $Al_2O_3$, in the shape of a frustum of a circular cone and has a circular top surface 30a having a shape exactly circumscribed around a photodiode (PD) chip 31, a conical surface 30b and an annular surface 30c. The circular top surface 30a, the conical surface 30b and the annular surface 30c are metallized by evaporation or the like. The PD chip 31 is die-bonded with an Au-Sn solder to the circular top surface 30a of the carrier 30. The circular shape of the circular top surface 30a of the carrier 30 has a shape exactly circumscribed around the PD chip 31 to facilitate positioning the PD chip 31 on the carrier 30.

A through hole is formed in the carrier 30 along the center axis of the carrier 30. A terminal 32 is fixedly inserted in the through hole with its extremity electrically connected to the PD chip 31. A bonding wire 33, such as a gold wire, has one end bonded to the pad of the PD chip and the other end bonded to the annular surface 30c of the carrier 30.

A ferrule support member 34 formed of a metal, such as Kovar or a stainless steel, is provided with a central ferrule receiving hole 34a. A taper recess 35 having the shape of a frustum of a circular cone is formed coaxially with the ferrule receiving hole 34a in the lower end of the ferrule support member 34. The conical surface of the taper recess 35 of the ferrule support member 34 fits the conical surface of the carrier 30. Paste solder is applied to the metallized conical surface 30b of the carrier 30, the ferrule support member 34 is placed on the carrier 30 with the conical surface 35a of the taper recess 35 in close contact with the conical surface 30b of the carrier 30, the solder is melted, and then the molten solder is solidified to join hermetically the carrier 30 and the ferrule support member 34.

A ferrule 37 having a flange 37a holds a tapered optical fiber 36 with a spherical tip fixedly. The ferrule 37 fixedly holding the tapered optical fiber 36 is inserted in the ferrule receiving hole 34a of the ferrule support member 34 with the flange 37a seated on the upper end surface of the ferrule support member 34, and then the flange 37a is soldered hermetically to the ferrule support member 34. The tapered optical fiber 36 is fixed beforehand to the ferrule 37 so that the PD chip 31 and the tapered optical fiber 36 are optically coupled at the maximum coupling efficiency when the ferrule 37 is thus attached in place to the ferrule support member 34 as shown in FIG. 2. The terminal 32 and the ferrule support member 34 are electrically connected, respectively, to the cathode and anode of the PD chip 31.

Second Embodiment (FIGS. 5 to 7B)

A photodetector module in a second embodiment according to the present invention is substantially the same in construction as the photodetector module in the first embodiment shown in FIGS. 2 and 3, except that the photodetector module in the second embodiment is provided with a separate anode terminal 48, and a sealing member 46.

Figure 5:
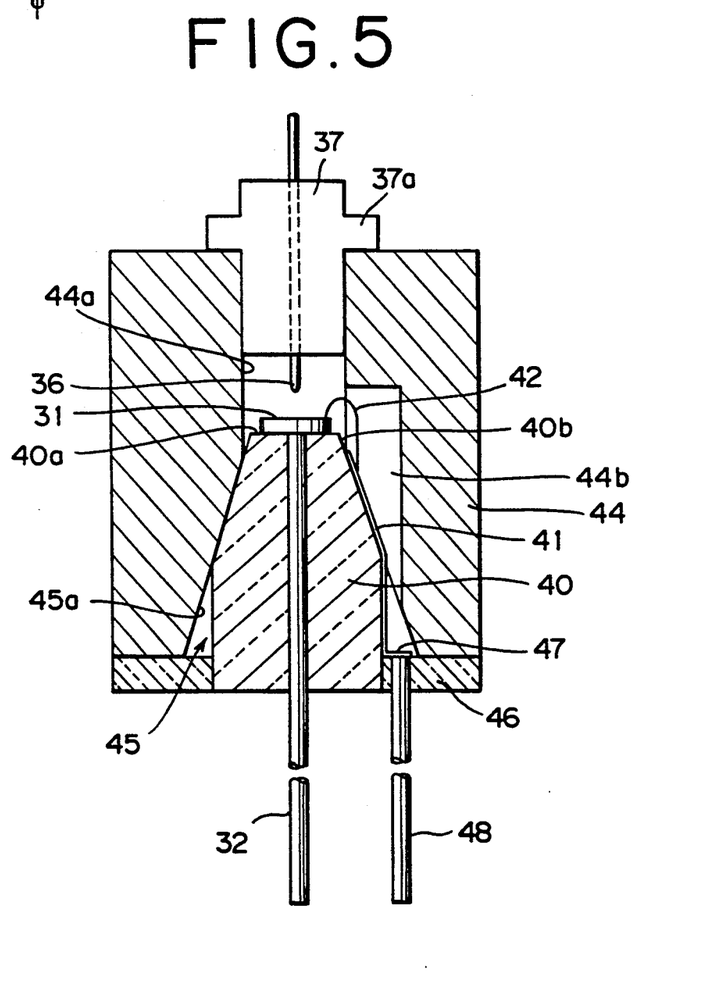
FIG. 5 is a longitudinal sectional view of a photodetector module in a second embodiment according to the present invention.
Figure 6:
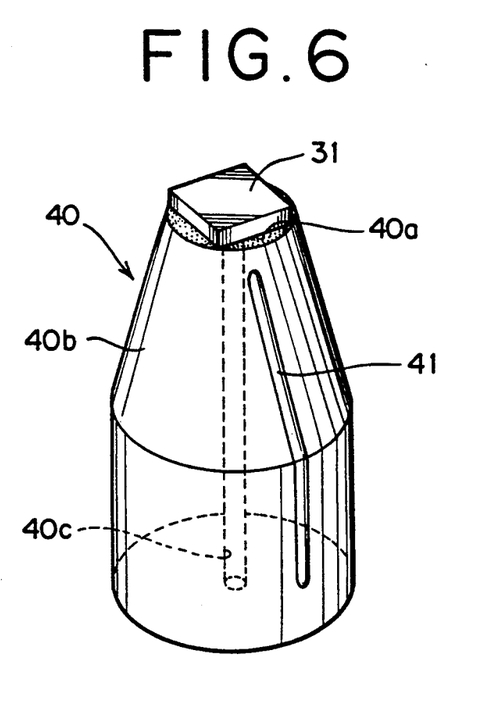
FIG. 6 is a perspective view of a carrier employed in the second embodiment.

Referring to FIG. 5, a ceramic carrier 40 having the shape of a frustum of a circular cone has a metallized, circular, top surface 40 exactly circumscribed around a PD chip 31 to be mounted on the carrier 40. A conductive film 41 is formed on the conical surface 40b and the cylindrical surface extending from the conical surface 40b of the carrier 40. The carrier is provided with a central through hole 40c for receiving a terminal 32. The PD chip 31 is die-bonded to the circular top surface 40a of the carrier 40, and the pad of the PD chip 31 is connected to the conductive film 41 with a bonding wire 42. The terminal 32 is fixedly inserted in the central through hole 40c of the carrier 40 with its extremity electrically connected to the PD chip 31.

A ferrule support member 44 formed of a metal, such as Kovar or a stainless steel, has a taper recess 45 having the shape of a frustum of a circular cone having a conical surface 45a fitting the conical surface 40b of the carrier 40. The ferrule support member 44 is provided with a ferrule receiving hole 44a. The ferrule support member 44 is provided with a groove 44b to avoid contact with the bonding wire 42. A ferrule 37 having a flange 37a and fixedly holding a taper optical fiber 36 with a spherical tip is fitted in the ferrule receiving hole 44a of the ferrule support member 44 with its flange 37a seated on the upper end surface of the ferrule support member 44. The flange 37a of the ferrule 37 is soldered to the upper end surface of the ferrule support member 44.

Figure 7A:
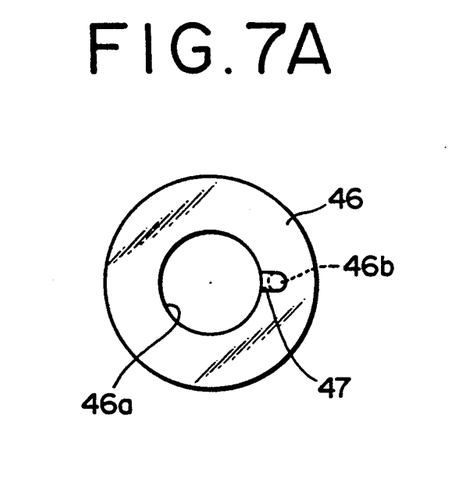
FIGS. 7A and 7B are a plan view and a front elevation, respectively, of a sealing member.
Figure 7B:
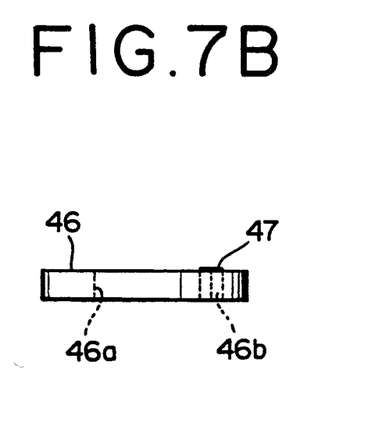

A sealing member 46 formed of a ceramic or the like has a carrier receiving hole 46a of a larger diameter and a terminal receiving hole 46b of a smaller diameter as shown in FIGS. 7A and 7B. A conductive film 47 is formed on the upper surface of the sealing member 46 so as to cover the upper end of the terminal receiving hole 46b. The upper surface of the sealing member 46 excluding a portion in which the conductive film 47 is formed, and the inner circumference of the carrier receiving hole 46a are metallized. The sealing member 46 is joined to the lower end of the ferrule support member 44 as shown in FIG. 5, and then the sealing member 46 is soldered hermetically to the ferrule support member 44 and the carrier 40. A terminal 48 is inserted fixedly in the terminal receiving hole 46b of the sealing member 46 as shown in FIG. 5. Thus, the terminal 48 is connected electrically through the conductive film 47 formed on the sealing member 46, the conductive film formed on the carrier 40 and the bonding wire 42 to the pad of the PD chip 31.

Figure 8:
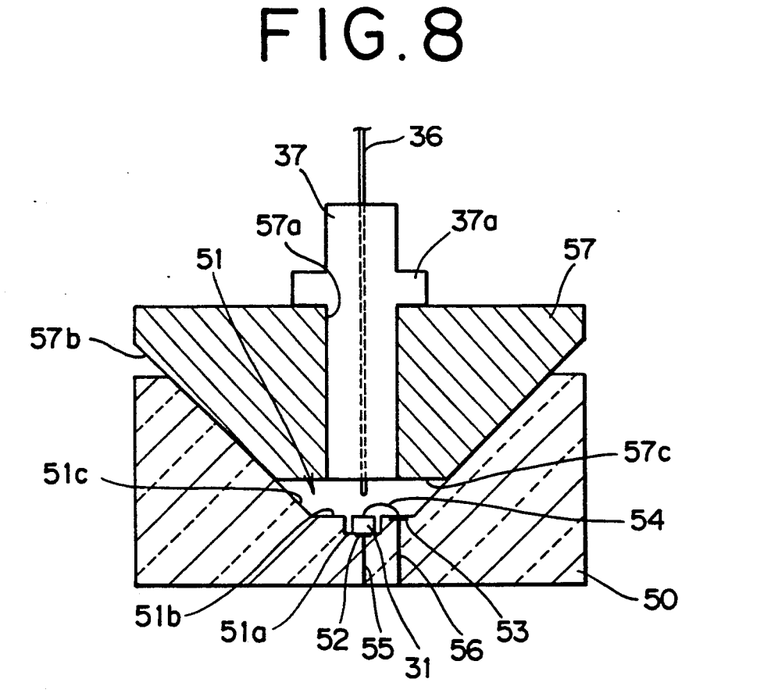
FIG. 8 is a longitudinal sectional view of a photodetector module in a third embodiment according to the present invention.
Figure 9:
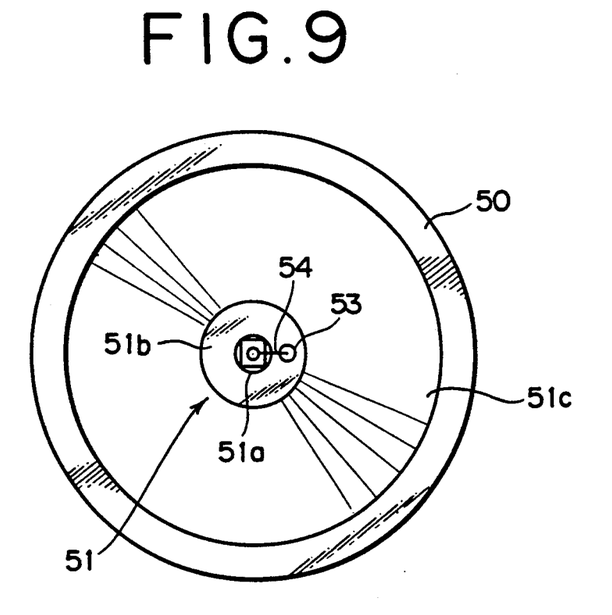
FIG. 9 is a plan view of a carrier employed in the third embodiment.

Third Embodiment (FIGS. 8 and 9)

A photodetector module in a third embodiment according to the present invention differs from those in the first and second embodiments in the respective shapes of a carrier and a ferrule support member employed therein.

Referring to FIG. 8, a ceramic carrier 50 is provided in its upper surface with a taper recess 51 having the shape of a frustum of a circular cone. A circular recess having a circular bottom surface 51a exactly circumscribed around a PD chip 31 to be mounted on the carrier 50 is formed in the central portion of the bottom surface of the taper recess 51. The depth of the circular recess is approximately the same as the thickness of the PD chip 31.

Electrodes 52 and 53 are buried, respectively, in the circular bottom surface 51a and an annular bottom surface 51b surrounding the circular recess. The electrodes 52 and 53, and terminals 55 and 56 are buried in the ceramic ferrule support member 50, respectively, at predetermined positions before sintering the ceramic ferrule support member 50. The electrodes 52 and 53, and the terminals 55 and 56 may be attached adhesively to the ferrule support member 50, respectively, at predetermined positions with an adhesive. The pad of the PD chip 31 is connected to the electrode 53 with a bonding wire 54.

A ferrule support member 57 is formed of a metal, such as Kovar or a stainless steel, in the shape of a frustum of a circular cone and is provided with a ferrule receiving hole 57a in its central portion. The taper surface 57b of the ferrule support member 57 fits the taper surface 51c of the taper recess 51 of the carrier 50. The ferrule receiving hole 57a and the taper surface 57b are coaxial. The lower end surface 57c and upper end surface of the ferrule support member 57 are parallel. A ferrule 37 having a flange 37a and holding a taper optical fiber 36 with a spherical tip is fitted in the ferrule receiving hole 57a of the ferrule support member 57. The flange 37a of the ferrule support member 37 is soldered hermetically to the upper end surface of the ferrule support member 57. The ferrule support member 57 is joined to the carrier 50 with its taper surface 57c in close contact with the taper surface 51c of the carrier and is attached adhesively with an adhesive to the carrier 50.

Since the central, circular bottom surface 51a of the circular recess formed in the carrier 50 has a shape exactly circumscribed around the PD chip 31, the PD chip 31 can easily and accurately be located on the carrier 50 by simply placing the PD chip 31 on the central, circular bottom surface 51a. In die bonding the PD chip 31 to the central, circular bottom surface 51a, an Au-Sn solder pellet is placed on the central, circular bottom surface 51a, the Au-Sn solder pellet is melted, the PD chip held with a jig is turned in opposite directions for scrubbing in the circular recess having the central, circular bottom surface 51a to spread the molten Au-Sn solder uniformly over the central, circular bottom surface 51a, and then the molten Au-Sn solder is left to solidify to fix the PD chip 31 to the central, circular bottom surface 51a. Since the PD chip 31 is turned in opposite directions for scrubbing within the circular recess, the Au-Sn solder is not spread outside the circular recess.

Since the PD chip 31 is thus fixed to the central, circular bottom surface 51a with its upper surface flush with the electrode 53 buried in the annular bottom surface 51b, the pad of the PD chip 31 and the electrode 53 can be connected with a comparatively short bonding wire, so that the signal processing speed of the photodetector module is enhanced.

Figure 10:
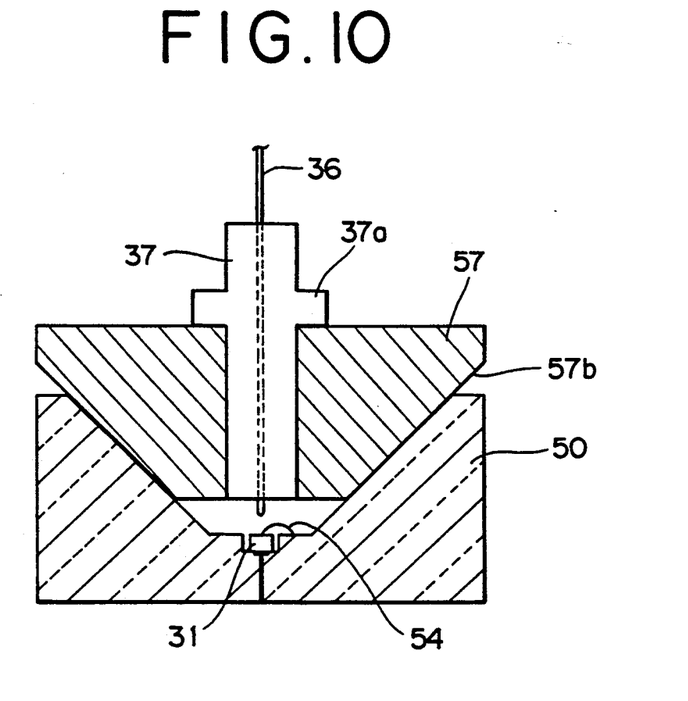
FIG. 10 is a longitudinal sectional view of a photodetector module in a fourth embodiment according to the present invention.
Figure 11:
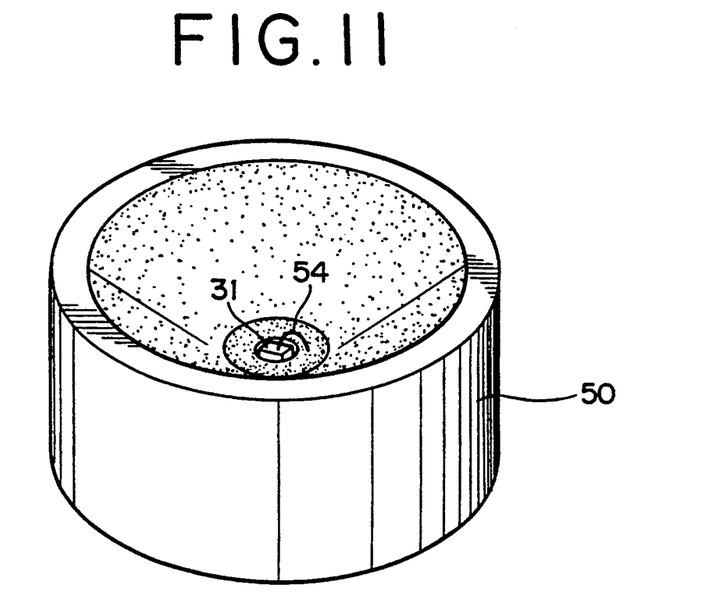
FIG. 11 is a perspective view of a carrier employed in the fourth embodiment.

Fourth Embodiment (FIGS. 10 and 11)

A photodetector module in a fourth embodiment according to the present invention is analogous in construction with the photodetector module in the third embodiment, and hence only differences between the third and fourth embodiments will be described.

As shown in FIG. 10, a carrier 50 employed in the fourth embodiment is not provided with any terminal corresponding to the terminal 56 included in the photodetector module in the third embodiment. As best shown in FIG. 11, the annular bottom surface 51b and taper surface 51c of the taper recess 51 having the shape of a frustum of a circular cone of the carrier 50 are metallized, and the pad of a PD chip 31 is connected to the metallized annular bottom surface 51b of the recess 51 with a bonding wire 54. Thus, a ferrule support member 57 formed of a metal is connected electrically through the metallized surfaces of the carrier 50 and the bonding wire 54 to the PD chip 31. The carrier 50 is soldered hermetically to the ferrule support member 57.

Fifth Embodiment (FIGS. 12A to 15)

Figure 12A:
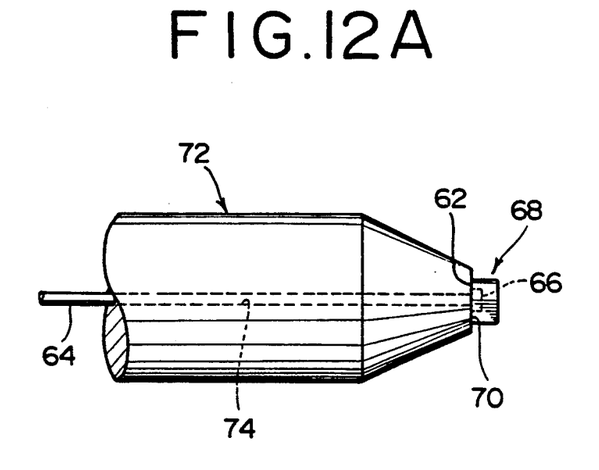
FIGS. 12A and 12B are a side elevation and a front elevation, respectively, of a photodetector module in a fifth embodiment according to the present invention.
Figure 12B:
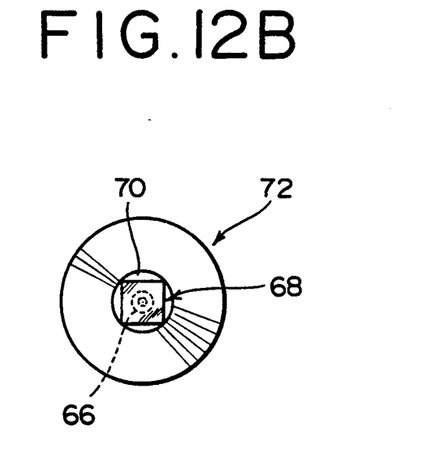

Referring to FIGS. 12A and 12B, a photodetector module in a fifth embodiment according to the present invention comprises a PD chip 68 having a square light receiving surface 62 provided in its central portion with a light receiving area 66 of a diameter greater than the outside diameter of an optical fiber 64, and a ferrule 72 having an end portion formed in the shape of a frustum of a circular cone and having a circular top surface 70 having a shape exactly circumscribed around the square light receiving surface 62 of the PD chip 68. The optical fiber 64 is fixedly inserted in the small central bore 74 of the ferrule 72 with its extremity flush with the circular top surface 70. The PD chip 68 is attached closely to the circular top surface 70 of the ferrule 72 so as to be inscribed in the circular top surface 70.

Since the PD chip 68 has the light receiving area 66 in the central portion of its light receiving surface 62 and the diameter of the light receiving area 66 is greater than the outside diameter of the optical fiber 64, the extremity of the optical fiber 64 inserted in the central bore 74 of the ferrule 72 is included in the light receiving area 66, so that the PD chip 68 is able to function at a high light receiving efficiency. Since the light receiving surface 62 has a shape exactly inscribed in the circular top surface 70, the PD chip 68 can be located correctly without requiring positional adjustment with respect to the X-axis and the Y-axis. Since the optical fiber 64 is fixedly inserted in the central bore 74 of the ferrule 72 with its extremity flush with the circular top surface 70 of the ferrule 72 and the PD chip 68 is attached to the circular top surface 70 with its light receiving surface 62 in close contact with the circular top surface 70, the positional adjustment of the optical fiber 64 with respect to the Z-axis is unnecessary.

Figure 13A:
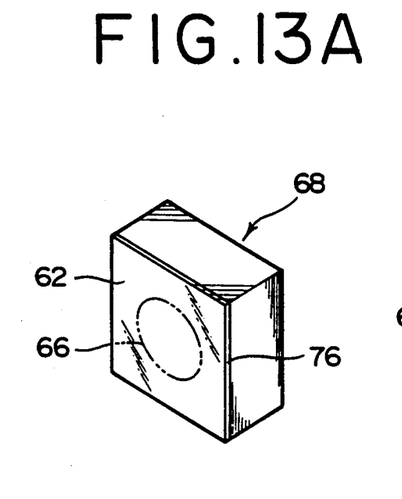
FIGS. 13A and 13B are perspective views respectively showing the front side and rear side of a photodetector chip employed in the fifth embodiment.
Figure 13B:
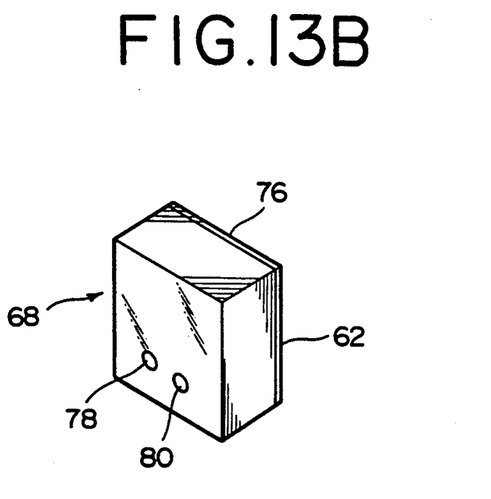

Referring to FIGS. 13A and 13B, the shape of the PD chip 68 is cuboidal and the light receiving surface 62 is square. The circular light receiving area 66 is formed in the central portion of the square light receiving surface 62 to convert a light signal into a corresponding electrical signal. The circular light receiving area 66 has its center at the intersection point of the two diagonals of the light receiving surface 62. The diameter of the light receiving area 66 is, for example, 150 μm which is greater than the outside diameter of, for example, 125 μm of the cladding of the optical fiber 64. The light receiving surface 62 is coated with a protective film 76 formed of silicon nitride to passivate the light receiving area 66. Two electrodes 78 and 80 through which electrical signals are provided are attached to the backside of the PD chip 68, i.e., the surface opposite the light receiving surface 62. The length of the sides of the square light receiving surface 62 is about 2 mm.

Figure 14:
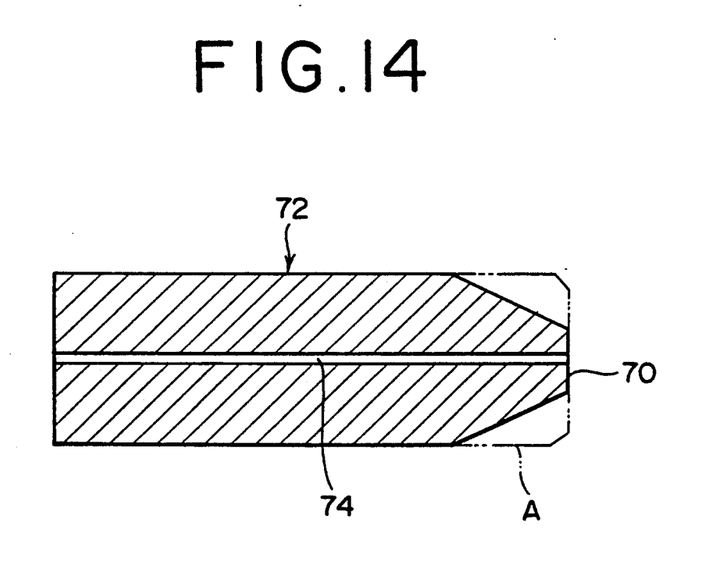
FIG. 14 is a sectional view of the ferrule of the fifth embodiment.

Referring to FIG. 14, the ferrule 72 is fabricated by grinding one end of a substantially cylindrical work in the shape of a frustum of a circular cone so that the circular top surface 70 of a given diameter is formed. The central bore 74 is formed by precision boring so as to open in the central portion of the circular top surface 70 coaxially with the same. The ferrule 72 may be formed by molding instead of machining.

Figure 15:
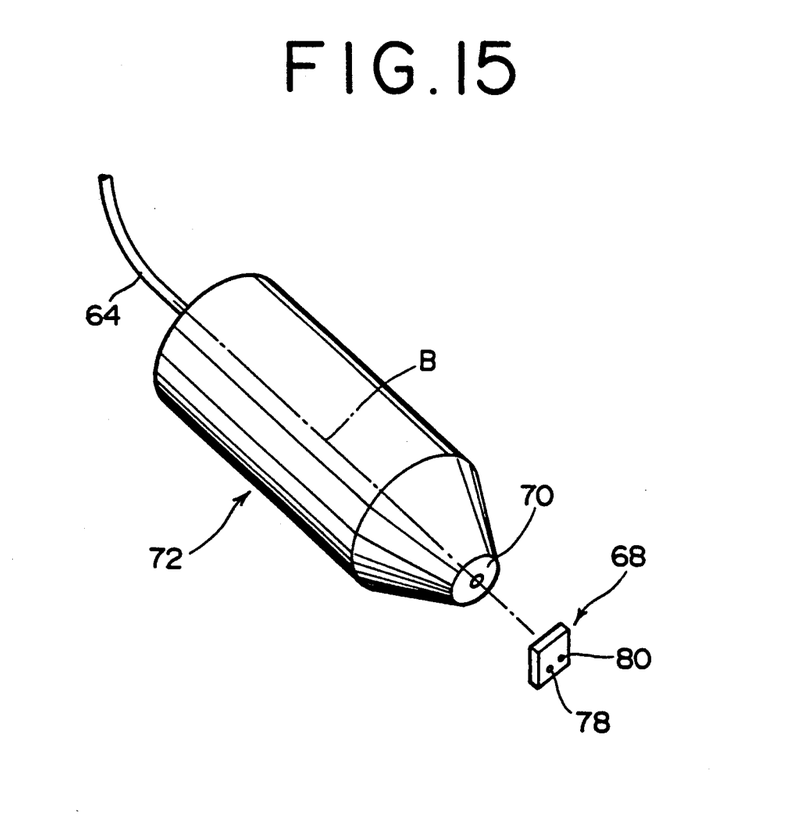
FIG. 15 is an exploded perspective view of a photodetector module in a fifth embodiment according to the present invention.

A method of manufacturing the photodetector module will be described hereinafter with reference to FIG. 15.

The optical fiber 64 is fixedly inserted in the central bore 74 of the ferrule 72 with its extremity flush with the circular top surface 70 of the ferrule 72. The optical fiber 64 is fixed to the ferrule 72, for example, by adhesively attaching the end portion of the optical fiber 64 to the ferrule 72 with an adhesive. The extremity of a nylon sheath, not shown, covering a portion of the optical fiber 64 extending outside the ferrule 72 may be fixed adhesively with an adhesive to the rear end of the ferrule 72.

Then, the PD chip 68 is attached to the ferrule 72 fixedly holding the optical fiber 64. The PD chip 68 must be fixed to the circular top surface 70 so that the light receiving area 66 of the PD chip 68 is coaxial with the circular top surface 70, namely, the center of the light receiving area 66 is on the axis B of the ferrule 72. Since the light receiving surface 62 of the PD chip 68 has a shape circumscribed in the circular top surface 70, the center of the light receiving area 66 is located accurately on the axis B of the ferrule 72. The PD chip 68 may be attached adhesively to the circular top surface 70 with an optical adhesive which is transparent when solidified to the wavelength of a light signal to be received by the PD chip 68.

Generally, a light beam emitted from the extremity of an optical fiber exposed to the air expands at an angle according to the numerical aperture of the optical fiber. However, in this photodetector module, a light beam emitted from the extremity of the optical fiber 64 expands scarcely because the extremity of the optical fiber 64 and the PD chip 68 are separated only by the very thin layer of the optical adhesive and the very thin protective film 76. Accordingly, the light beam transmitted through the optical fiber 64 is made to fall satisfactorily on the light receiving area 66 having a diameter greater than the outside diameter of the optical fiber 64.

Figure 16:
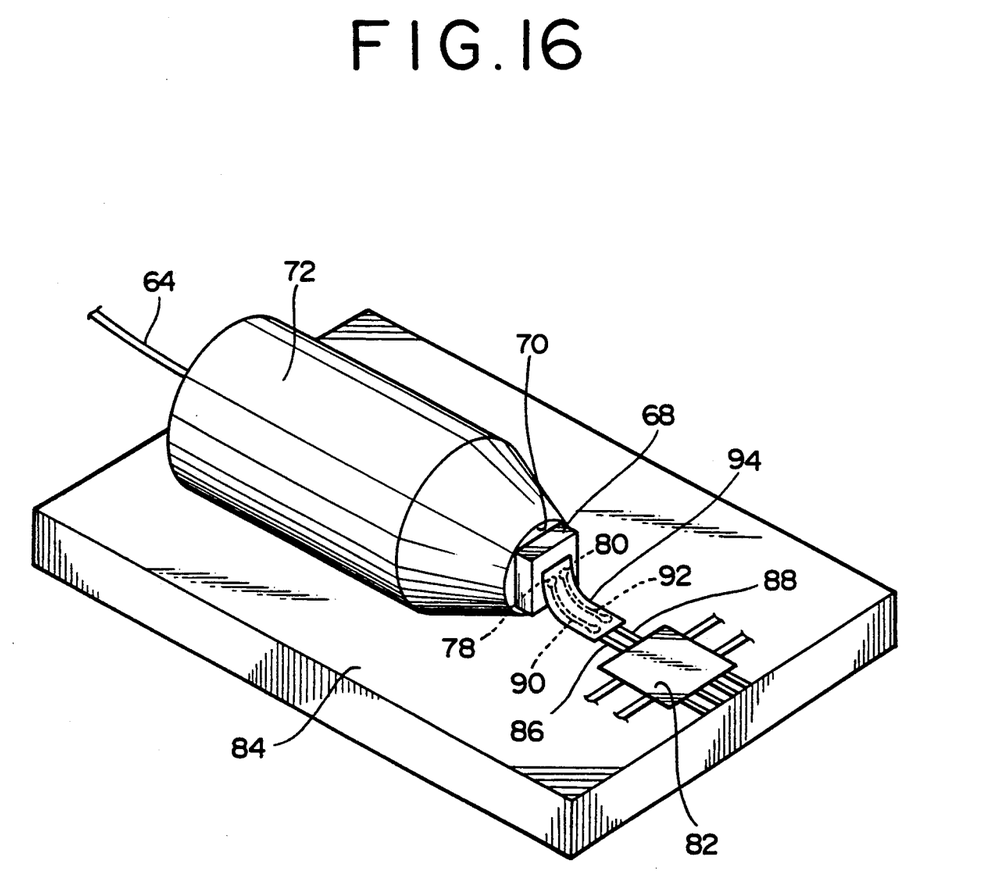
FIG. 16 is a perspective view of the photodetector module in the fifth embodiment as mounted on a substrate.

The photodetector module thus assembled is mounted on a substrate 84 as shown in FIG. 16. The photodetector module is fixed to the substrate 84, and then the photodetector module is connected electrically to an electronic circuit 82 mounted on the substrate 84 by connecting the electrodes 78 and 80 provided on the backside of the PD chip 68, respectively, to conductive films 86 and 88 extending from the electronic circuit 82 with a flexible printed cable 94 having at least two conductive strips 90 and 92. The opposite ends of the conductive strip 90 are soldered, respectively, to the electrode 78 and the conductive film 86, and the opposite ends of the conductive strip 92 are soldered, respectively, to the electrode 80 and the conductive film 88. The electrodes 78 and 80 provided on the backside, i.e., the side opposite to the light receiving surface 62, of the PD chip 68 facilitates the electrical connection of the photodetector module to the electronic circuit 82. The ferrule 72 may be fixed to the substrate 84 by previously metallizing the outer circumference of the ferrule 72 and a corresponding portion in the upper surface of the substrate 84, and soldering the metallized ferrule 72 to the metallized portion of the substrate 84.

Although the light receiving surface 62 of the PD chip employed in the fifth embodiment is square, a PD chip having a rectangular light receiving surface may be employed, because the latter PD chip can be attached to the circular top surface of the ferrule 72 so that the rectangular light receiving surface is inscribed in the circular top surface with the intersection point of the diagonals of the rectangular light receiving surface coinciding with the center of the circular top surface of the ferrule 72.

What is claimed is:
1. A photodetector module comprising;
   a cuboidal photodetector chip;
   a carrier having a taper surface having the shape of a frustum of a circular cone, and a circular top surface having the shape of a circle circumscribed around the photodetector chip, said photodetector chip being mounted on the circular top of said carrier;

a ferrule support member provided with a central ferrule receiving hole, and a taper recess having the shape of a frustum of a circular cone and a taper surface fitting that of said carrier, and mounted on said carrier with its taper surface in close contact with that of said carrier, said ferrule receiving hole opening into the taper recess;

a ferrule having a flange, fixedly fitted in the ferrule receiving hole of said ferrule support member with its flange seated on the end surface of said ferrule support member; and an optical fiber inserted in and fixedly held by said ferrule with the extremity thereof located at a given distance from said photodetector chip.

2. A photodetector module according to claim 1, wherein said optical fiber is a taper optical fiber with a spherical tip.

3. A photodetector module according to claim 1, wherein the taper surface of said carrier is metallized, the metallized taper surface of said carrier is hermetically soldered to the taper surface of said ferrule support member, and the flange of said ferrule is hermetically soldered to said ferrule support member.

4. A photodetector module according to claim 1, wherein a through hole is formed in the central portion of said carrier, a conductive film is formed on the circumference of said carrier, a first terminal is inserted in the through hole so as to be electrically connected to said photodetector chip, said conductive film is connected to said photodetector chip with a bonding wire and to a second terminal, and a groove is formed in said ferrule support member so that the bonding wire may not touch said ferrule support member.

5. A photodetector module according to claim 4, wherein a sealing member provided with a through hole for receiving said second terminal and a conductive film is hermetically soldered to the circumference of said carrier and the bottom surface of said carrier so that its conductive film is electrically connected to the conductive film of said carrier, and said second terminal is inserted in the through hole of said sealing member so as to be electrically connected to the conductive film of said sealing member.

6. A photodetector module comprising:
a cuboidal photodetector chip;

a carrier provided with a taper recess having the shape of a frustum of a circular cone, and a central circular recess having a circular bottom surface having the shape of a circle circumscribed around the photodetector chip, said photodetector chip being attached to the circular bottom surface of the central circular recess of said carrier;

a ferrule support member having a ferrule receiving hold formed in its central portion and a taper surface having the shape of a frustum of a circular cone fitting the taper recess of said carrier, said ferrule support member being fixedly mounted on said carrier with its taper surface in close contact with said carrier;

a ferrule having a flange, and fixedly fitted in said ferrule receiving hole of said ferrule support member with its flange in contact with the end surface of said ferrule support member; and an optical fiber inserted in and fixedly held by said ferrule with its extremity located at a given distance from said photodetector chip.

7. A photodetector module according to claim 6, wherein said optical fiber is a taper optical fiber with a spherical tip.

8. A photodetector module according to claim 6, wherein the taper surface of the taper recess of said carrier is metallized, the taper surface of said carrier is hermetically soldered to the taper surface of said ferrule support member, and the flange of said ferrule is hermetically soldered to said ferrule support member.

9. A photodetector module comprising:
a cuboidal photodetector chip having a rectangular or square light receiving surface including a light receiving area in its central portion;

a ferrule provided with a central bore, and having a taper end having the shape of a frustum of a circular cone and a circular top surface having the shape of a circle circumscribed around said photodetector chip, said photodetector chip being fixedly mounted on the circular top surface so as to be inscribed in the circular top surface; and an optical fiber fixedly inserted in the central bore of said ferrule with its extremity flush with the circular top surface of said ferrule.

* * * * *

UNITED STATES PATENT AND TRADEMARK OFFICE
CERTIFICATE OF CORRECTION

PATENT NO. : 5,065,011
DATED : November 12, 1991
INVENTOR(S) : Makoto Fujihara, et al It is certified that error appears in the above-identified patent and that said Letters Patent is hereby corrected as shown below:

On the title page, Item [54]   delete "FOR COUPLING WITH OPTICAL FIBER";

Col. 1, line 1, under title, delete "FOR COUPLING WITH OPTICAL FIBER";

*Col. 2, line 42, "give" should be --given--; and

Col. 6, line 18, "die bonding" should be --die-bonding--.

Signed and Sealed this

Eleventh Day of May, 1993

Attest:

MICHAEL K. KIRK

Attesting Officer   Acting Commissioner of Patents and Trademarks